United States Patent
Nock

(10) Patent No.: US 9,156,449 B2
(45) Date of Patent: Oct. 13, 2015

(54) BRAKE SYSTEM OF A RAIL VEHICLE WITH COMPENSATION OF FLUCTUATIONS OF THE FRICTION CONDITIONS

(75) Inventor: Marco Nock, Feldkirchen (DE)

(73) Assignee: KNORR-BREMSE SYSTEME FUR SCHIENENFAHZEUGE GMBH, Munich (DE)

( * ) Notice: Subject to any disclaimer, the term of this patent is extended or adjusted under 35 U.S.C. 154(b) by 190 days.

(21) Appl. No.: 13/139,861

(22) PCT Filed: Dec. 11, 2009

(86) PCT No.: PCT/EP2009/008873
§ 371 (c)(1),
(2), (4) Date: Jun. 15, 2011

(87) PCT Pub. No.: WO2010/069520
PCT Pub. Date: Jun. 24, 2010

(65) Prior Publication Data
US 2012/0018260 A1   Jan. 26, 2012

(51) Int. Cl.
*B60T 8/17*   (2006.01)
*B60T 8/172*   (2006.01)
*B60T 8/52*   (2006.01)
*B60T 17/22*   (2006.01)

(52) U.S. Cl.
CPC ............... *B60T 8/1705* (2013.01); *B60T 8/172* (2013.01); *B60T 8/52* (2013.01); *B60T 17/221* (2013.01); *B60T 2210/12* (2013.01)

(58) Field of Classification Search
CPC .......................... B60W 50/04; B60W 30/188
USPC ............ 188/1.11 E, 72.1; 303/155, 191, 112; 701/19
See application file for complete search history.

(56) References Cited

U.S. PATENT DOCUMENTS

| 4,693,522 A | 9/1987 | Wupper et al. | |
| 5,601,347 A * | 2/1997 | Fischle et al. | 303/191 |
| 5,613,744 A * | 3/1997 | Eslinger et al. | 303/191 |

(Continued)

FOREIGN PATENT DOCUMENTS

| DE | 3500745 A1 | 7/1986 |
| DE | 4137546 A1 | 5/1993 |

(Continued)

OTHER PUBLICATIONS

Unofficial English Translation of Ullrich (DE 10248852).*

(Continued)

*Primary Examiner* — Robert A Siconolfi
*Assistant Examiner* — Mahbubur Rashid
(74) *Attorney, Agent, or Firm* — Barnes & Thornburg LLP

(57) ABSTRACT

A brake system of a rail vehicle, having at least one brake actuator with at least one brake disk and at least one brake lining, which interacts with the brake disk, for generating a braking force. Also disclosed is a sensor device to measure the time profile of at least one variable, representing fluctuations in the friction conditions between the wheel or wheel set assigned to the brake actuator and the rail and/or between the brake disk assigned to the brake actuator and the at least one brake lining, and to output a signal dependent on the measured variable to a control device which adapts the braking force generated by the brake actuator as a function of the deviation of the time profile of the measured variable from a predefined or expected time profile of the variable.

8 Claims, 1 Drawing Sheet

(56) References Cited

U.S. PATENT DOCUMENTS

| | | | |
|---|---|---|---|
| 7,234,567 | B2 | 6/2007 | Wagner et al. |
| 2001/0047684 | A1* | 12/2001 | Schmidt ............... 73/121 |
| 2009/0152054 | A1 | 6/2009 | Baumgartner et al. |
| 2009/0255329 | A1* | 10/2009 | Connell et al. ............ 73/121 |

FOREIGN PATENT DOCUMENTS

| | | |
|---|---|---|
| DE | 10248852 A1 | 5/2003 |
| DE | 10245207 C1 | 10/2003 |
| DE | 102005062416 A1 | 7/2007 |
| DE | 102006058882 A1 | 6/2008 |
| GB | 2261953 A | 6/1993 |
| JP | 11-5533 A | 1/1999 |
| JP | 2000-95080 A | 4/2000 |
| JP | 2003-291797 A | 10/2003 |
| JP | 2005-329740 A | 12/2005 |

OTHER PUBLICATIONS

Transmittal of Copy of International Preliminary Report on Patentability for International Application No. PCT/EP2009/008873 and Written Opinion.

English Translation of the International Preliminary Report on Patentability for International Application No. No. PCT/EP2009/008873 and Written Opinion.

Search Report for International Patent Application No. PCT/EP2009/008873; Nov. 15, 2010.

English Translation of Japanese Office Action for Japanese Application No. 2011-541174 dated Sep. 16, 2014.

\* cited by examiner

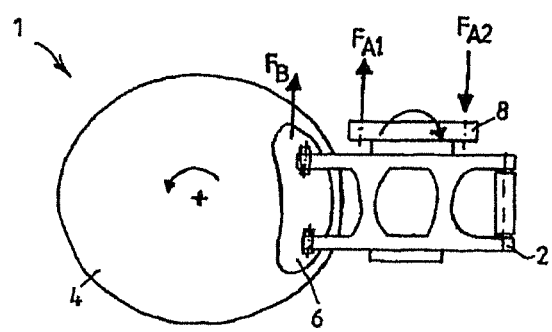
FIG.1
FIG.2
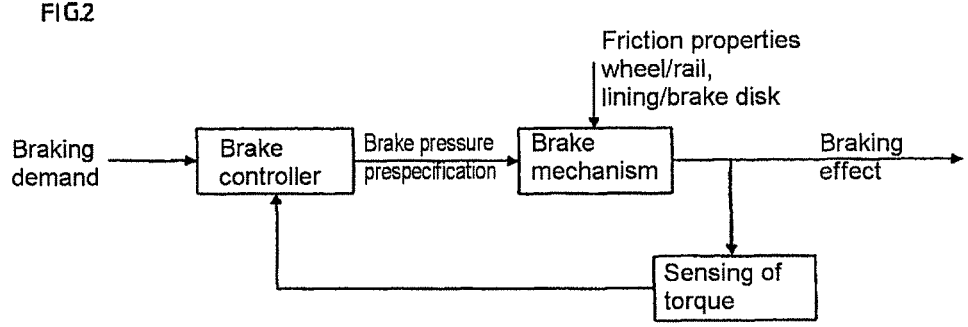

BRAKE SYSTEM OF A RAIL VEHICLE WITH COMPENSATION OF FLUCTUATIONS OF THE FRICTION CONDITIONS

RELATED APPLICATIONS AND PRIORITY CLAIM

This patent application is a U.S. National Phase of International Patent Application No. PCT/EP2009/008873, filed Dec. 11, 2009, which claims priority to German Patent Application No. 10 2008 063 892.7, filed Dec. 19, 2008, the disclosures of which are incorporated herein by reference in their entirety.

FIELD

Disclosed embodiments are based on a brake system of a rail vehicle, having at least one brake actuator which is assigned to a wheel or a wheel set and comprises at least one brake disk and at least one brake lining which interacts with the former in order to generate a braking force in response to a braking demand, and on a method for controlling such a brake system.

BACKGROUND

A brake system of the generic type and a method of the generic type are known, for example from DE 102 45 207 C1. In such brake systems, the friction conditions between the wheel or wheel set and the rail or, respectively, between the brake disks and the assigned brake linings fluctuate, in some cases considerably, depending on the weather, ambient temperature, state of wear and load profile. Furthermore, these friction conditions are also not constant along a rail vehicle or along a train composed of rail vehicles. In order to limit the influence of the friction conditions on the braking forces which can be generated or transmitted, very tight tolerances in terms of compliance with shape and dimensions, material composition, rigidity etc. are prescribed, in particular in the case of brake linings, which entails correspondingly high costs.

SUMMARY

The presently disclosed embodiments are therefore based, in contrast with the above, on developing a brake system or a method for controlling a brake system of the type mentioned at the beginning in such a way that the brake system entails fewer manufacturing and maintenance costs.

BRIEF DESCRIPTION OF THE FIGURES

Disclosed embodiments are illustrated in the drawings and explained in more detail in the following description. In the drawings:

FIG. 1 is a schematic lateral illustration of a disk brake system of a rail vehicle according to a disclosed embodiment; and FIG. 2 is a flowchart of a braking force adaptation or braking torque adaptation for compensating fluctuations in the friction conditions between the wheel or wheel set and rail or between the brake disk and brake linings according to a disclosed embodiment.

DETAILED DESCRIPTION

Disclosed embodiments provide at least one sensor device for measuring the time profile of at least one variable, such as a wheel rotational speed, wheel circumferential acceleration, braking force, braking torque or brake pressure, which represents fluctuations in the friction conditions between the wheel or wheel set assigned to the brake actuator and the rail and/or between the brake disk assigned to the brake actuator and the brake lining or brake linings, and for modulating a signal which is dependent on the measured variable and is output to a control device, which brake system is embodied in such a way that it adapts the braking force generated by the brake actuator as a function of the deviation of the time profile of the measured variable from a predefined or expected time profile of the variable.

In other words a certain degree of fluctuations in the friction conditions between the wheel or wheel set and the rail and/or between the brake disk and the brake lining is to be tolerated, but starting from a limit value (permitted deviation) the fluctuations are to be compensated by adapting the braking force or the braking torque.

In the case of a rail vehicle, fluctuations in the friction conditions between the wheel or wheel set and the rail and/or between the brake linings and the brake disk on the braked axles have a fed-back effect on the time profile of the braking force generated by the respective or the assigned brake actuator.

The braking force in the circumferential direction of the brake disk or the braking torque may, therefore, be used as the variable which represents fluctuations in the friction conditions between the wheel or wheel set and the rail and/or between the brake disk and the brake linings, may be measured as a time signal and may then be evaluated using the control device. In the case of a constant braking demand, deviations or fluctuations in the braking force or in the braking torque at a brake actuator from an expected time profile of these variables therefore indicate fluctuations in the friction conditions between the assigned wheel or wheel set and the rail and/or between the assigned brake disk and the brake linings.

The sensor device may, therefore, be designed to measure the braking force or the braking torque at a brake actuator and the control device to adapt the braking force generated by the brake actuator as a function of the deviation of the time profile of the measured braking force from a predefined time profile of the braking force. Instead of the braking force, the braking torque can, of course, also be monitored.

However, any other variable on which the fluctuations in the friction conditions have an effect and by which the friction conditions can be measured or detected is conceivable as a variable which represents fluctuations in the friction conditions between the wheel or wheel set assigned to a brake actuator and the rail or, respectively, between the brake disk assigned to a brake actuator and the brake linings, and whose time profile is to be measured and compared. In the case of rail vehicles or in the case of trains which are composed of individual rail vehicles, the forces between the individual rail vehicles (train longitudinal forces) are, for example, also possible.

The use of the braking force in the circumferential direction of the brake disk and/or of the braking torque at a brake actuator during a braking demand as a variable which represents fluctuations in the friction conditions between the assigned wheel or wheel set and the rail and/or between the assigned brake disk and the brake linings has the advantage that brake systems of rail vehicles are usually equipped in any case with a braking force control and therefore the corresponding sensor system, as described DE 102 45 207 C1. The time profiles of the braking force and/or of the braking torque which are measured in any case at a brake actuator can then be used simultaneously as representative variables or as indicators of the occurrence of fluctuations in the friction conditions between the assigned wheel or wheel set and the rail and/or between the assigned brake disk and the brake linings as indicators for fluctuations in the friction conditions, without an additional sensor system being necessary.

By adapting the braking force during a braking demand as a function of the measured fluctuations in the friction conditions, the contact pressure of the brake lining against the brake disk or that against the wheel circumference or against the effective braking force is changed. It is particularly useful here for the braking force to be increased somewhat compared to a setpoint braking force corresponding to the respective braking demand, in order to compensate for unfavorable friction conditions such as, for example, an excessively low coefficient of friction, caused by environmental conditions, between the wheel and the rail and/or the brake disk and the brake lining due to an increased braking force at the respective brake actuator.

The brake system may particularly comprise a plurality of brake actuators, wherein the control device is embodied in such a way that, if the deviation of the time profile of the measured variable from a predefined or expected time profile of the variable is greater than a permitted deviation at one brake actuator, the braking force at the one brake actuator is increased and, for the purpose of compensation, the braking force which is generated by a further brake actuator at which the deviation of the time profile of the measured variable from a predefined or expected time profile of the variable is smaller than the permitted deviation is reduced in such a way that the sum of the actual braking forces, obtained in this way, of the brake actuators corresponds to an overall setpoint braking force corresponding to the braking demand.

In this case, an increase in the braking force or in the braking torque compared to the braking demand at a brake actuator with unfavorable or no longer tolerable fluctuations in the friction conditions between an assigned wheel or wheel set and the rail and/or between the assigned brake disk and the brake linings no longer brings about over-braking because then, as a result of at least one further brake actuator at which no fluctuations, or tolerable fluctuations, occur in the friction conditions between the assigned wheel or wheel set and rail and/or between the assigned brake disk and the brake linings, a braking force or a braking torque is generated which is lower compared to the braking demand to such an extent that the overall braking force or the overall braking torque corresponds to the overall setpoint braking force or the overall setpoint braking torque. The sum of the braking torques which are generated in such a way at various brake actuators therefore remains unchanged.

FIG. 1 shows a disk brake system 1 of a rail vehicle according to a disclosed embodiment such as is basically also known, for example, from DE 102 45 207 C1 and is therefore only briefly described below. The disk brake system 1 includes, as a brake actuator or brake application device a brake caliper unit 2 with a service brake unit and a stored-energy brake unit (not considered here). The brake caliper unit 2 comprises a brake disk 4 which interacts in a known fashion with, for example, two brake linings 6, only one of which can be seen in the side view in FIG. 1. The brake caliper unit 2 may be activated pneumatically, in order to generate a braking force $F_B$, acting in the circumferential direction of the brake disk 4, in response to a braking demand. Alternatively, the brake caliper unit 2 could, of course, also be activated by pressure medium in some other way, for example, be activated hydraulically or else electrically.

Since the brake caliper unit 2 is supported by means of a holder 8 on a bogie (not shown here) of the rail vehicle, a reaction torque $M_A$ or reaction forces $F_{A1}$, $F_{A2}$ acts on the holder 8, at attachment points of the holder 8 on the bogie which are spaced apart from one another and which can be measured by means of a force measuring sensor system such as, for example, a strain gauge on corresponding connecting components between the holder 8 and the bogie. The rail vehicle may comprise a plurality of bogies each with a plurality of such brake actuators or brake caliper units 2, with the result that the braking forces which are generated by at least some of these brake caliper units 2 can be measured and evaluated in a control device (not shown here). Only one of the brake caliper units 2 of the rail vehicle which are of, for example, identical design, is shown by way of example in FIG. 1.

In particular, the sensor device which is assigned to a brake caliper unit 2 serves to measure the time profile of at least one variable, such as wheel rotational speed, wheel circumferential acceleration, braking force, braking torque or brake pressure, which represents fluctuations in the friction conditions between the wheel and the rail and/or between the brake disk 4 and brake lining 6, and to modulate the signal which is dependent on the measured time profile and is output to a control device, which brake system is embodied in such a way that it adapts the braking force generated by the brake actuator 2 which is assigned to the wheel or the wheel set and/or to the brake disk and the brake linings, as a function of the deviation of the time profile of the measured variable from a predefined or expected time profile of the variable.

For example the wheel rotational speed, the wheel circumferential acceleration, the braking force, the braking torque $M_A$ or else the brake pressure in the case of a pneumatically activated brake caliper unit are possible as such a variable. In the case of electrically activated brake caliper units 2, the variable could, for example, also be the activation current.

The braking force in the circumferential direction of the brake disk 4 or the braking torque $M_A$ of a brake caliper unit 2 during a braking demand may be used as a variable which represents the fluctuations in the friction conditions between the wheel assigned to the brake caliper unit 2 or the wheel set assigned to the brake caliper unit 2 and/or between the brake disk 4 assigned to the brake caliper unit 2 and brake lining 6 assigned to the brake caliper unit 2, is measured as a time signal or time profile over a specific predefined time period, and is then evaluated using the control device (brake controller).

In other words, in this case the braking force or the braking torque or the time profile of the respective variable is measured, and then the braking force or the braking torque generated by the assigned brake caliper unit 2 is adapted as a function of the deviation of the time profile of the measured braking force from a predefined or expected time profile of the braking force. Instead of the braking force, the braking torque can, of course, also be monitored.

It is also possible that, instead of just one variable, a plurality of variables, which represent fluctuations in the friction conditions between the wheel or wheel set and rail and/or between the brake disk 4 and brake lining 6 and are assigned to the respective brake caliper unit 2, to be monitored in parallel. Given a constant braking demand, changes or fluctuations in the time profile of the measured braking force or of the measured braking torque $M_A$ or deviations from the expected time profile then indicate fluctuations in the friction conditions between the wheel or wheel set assigned to the respective brake caliper unit 2 and the rail and/or between the brake disk 4 and the brake lining 6 at the respective brake caliper unit 2.

As is most clear from FIG. 2, the time profiles of the braking force or of the braking torque $M_A$ (torque sensing) at a brake caliper unit 2 are therefore measured, wherein the control device (brake controller) adapts the braking torque $M_A$ generated by the respective brake caliper unit 2, as a function of the deviation of the measured time profile of the braking torque $M_A$, influenced, under certain circumstances, by fluctuations in the friction conditions between the assigned wheel or wheel set and the rail and/or between the assigned brake disk 4 and the brake lining 6, from a predefined or expected time profile of the braking torque (braking demand) at this brake caliper unit 2, for example by means of brake pressure prespecification for a pneumatically activated brake caliper unit 2. Fluctuating friction properties between the assigned wheels and the rail and/or between the brake disk 4 and the brake lining 6 then act as interference variables on the braking mechanism of the brake caliper unit 2.

In practice, the brake system of a rail vehicle may comprise a plurality of brake actuators or brake caliper units 2, wherein the control device may be embodied in such a way that, if in the case of one of the brake caliper units 2, the deviation of the measured time profile (e.g., the measured time profile of the braking torque) from a predefined or an expected time profile is greater than a permitted deviation (intolerable fluctuations of the friction forces occur at this one brake caliper unit 2), the brake system increases the braking force or the braking torque at this one brake caliper unit 2, and, for the purpose of compensation, the braking force or braking torque generated by a further brake caliper unit 2, at which the deviation of the measured time profile from the predefined or expected time profile is smaller than the permitted deviation (i.e. tolerable fluctuations in the friction properties occur at this further brake caliper unit 2), is reduced in such a way that the sum of the actual braking forces and actual braking torques obtained in this way, for all or of at least some of the brake caliper units 2 corresponds to an overall setpoint braking force corresponding to the braking demand or to an overall setpoint braking torque corresponding to the braking demand.

In this case, for example an increase in the braking force or in the braking torque at the one brake caliper unit 2 compared to the braking demand due to disruptive or intolerable fluctuations in the friction conditions between the assigned wheel or wheel set and the rail and/or between the assigned brake disk 4 and the assigned brake lining 6 does not, for example, bring about over-braking of the rail vehicle because, due to at least one further brake caliper unit 2 at which no fluctuations, or tolerable fluctuations, in the friction conditions occur between the assigned wheel or wheel set and the rail and/or between the assigned brake disk 4 and the assigned brake lining 6, a braking force or a braking torque is generated which is lower compared to the braking demand to such an extent that the overall braking force or the overall braking torque corresponds to the overall setpoint braking force or the overall setpoint braking torque.

LIST OF REFERENCE NUMBERS

1 Brake system
2 Brake caliper unit
4 Brake disk
6 Brake linings
8 Holder

The invention claimed is:

1. A brake system of a rail vehicle, the brake system comprising:
    a brake actuator which is assigned to a wheel or a wheel set and includes a brake disk and a brake lining which interacts with the brake disk to generate a braking force in response to a braking demand;
    at least one sensor device that measures a time profile of at least one variable, wherein the at least one variable is one of a wheel rotational speed, a wheel circumferential acceleration, a braking force, a braking torque and brake pressure, wherein the at least one variable represents fluctuations in friction conditions between the wheel or wheel set assigned to the brake actuator and a rail or fluctuations in friction conditions between the brake disk assigned to the brake actuator and the brake lining, wherein the at least one sensor device modulates and outputs a signal which is dependent on the at least one variable,
    a control device that receives the signal output from the at least one sensor device, wherein the control device adapts a braking force generated by the brake actuator as a function of a deviation of the at least one variable from a predefined or expected time profile of the at least one variable, wherein in response to a deviation that is greater than a permitted deviation at the brake actuator, the braking force at the brake actuator is increased and, for the purpose of compensation, a braking force at a further brake actuator with a deviation that is smaller than the permitted deviation is reduced resulting in the sum of the actual braking forces, of the brake actuator and the further brake actuator corresponding to an overall setpoint braking force corresponding to the braking demand.

2. The brake system of claim 1, wherein the at least one variable which represents the fluctuations in the friction conditions between the wheel or the wheel set and rail or between the brake disk and the brake lining is the braking force generated by an assigned braking actuator of the plurality of braking actuators or the braking torque generated by that assigned brake actuator.

3. The brake system of claim 1, wherein the at least one variable is selected from a group consisting of a wheel rotational speed, a wheel circumferential acceleration, a braking force, a braking torque and a brake pressure.

4. The brake system of claim 2, wherein the at least one variable is selected from a group consisting of a wheel rotational speed, a wheel circumferential acceleration, a braking force, a braking torque and a brake pressure.

5. A method for controlling a brake system of a rail vehicle, having a brake actuator which is assigned to a wheel or a wheel set and comprises a brake disk and a brake lining which interacts with a brake disk to generate a braking force in response to a braking demand, the method comprising:
    measuring a time profile of at least one variable using a sensor, wherein the at least one variable is one of a wheel rotational speed, a wheel circumferential acceleration, a braking force, a braking torque or a brake pressure,
    wherein the at least one variable represents fluctuations in the friction conditions between the wheel or wheel set assigned to the brake actuator and a rail or represents fluctuations in the friction conditions between the assigned brake disk and the at least one brake lining,
    wherein the method further comprises adapting a braking force generated by the brake actuator as a function of the deviation the at least one variable from the predefined or expected time profile of the at least one variable, and in response to a deviation that is greater than a permitted deviation at the brake actuator, the braking force at the brake actuator is increased and, for the purpose of compensation, a braking force which is generated by a further brake actuator at which the deviation is smaller than the permitted deviation is reduced resulting in the sum of the actual braking forces of the brake actuator and further brake actuator corresponding to an overall setpoint braking force corresponding to the braking demand.

6. The method of claim 4, wherein the at least one variable which represents the fluctuations in the friction conditions between the wheel or wheel set and the rail or between the brake disk and the brake lining is the braking force generated by the at least one brake actuator or the braking torque.

7. The brake system of claim 5, wherein the at least one variable is selected from a group consisting of a wheel rotational speed, a wheel circumferential acceleration, a braking force, a baking torque and a brake pressure.

8. The brake system of claim 6, wherein the at least one variable is selected from a group consisting of a wheel rotational speed, a wheel circumferential acceleration, a braking force, a baking torque and a brake pressure.

* * * * *